United States Patent
Wilson et al.

(10) Patent No.: US 10,431,833 B2
(45) Date of Patent: Oct. 1, 2019

(54) COATINGS FOR METAL INTERCONNECTS TO REDUCE SOFC DEGRADATION

(75) Inventors: James Wilson, San Francisco, CA (US); Manoj Pillai, Sunnyvale, CA (US); Tad Armstrong, Burlingame, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 1186 days.

(21) Appl. No.: 13/409,629

(22) Filed: Mar. 1, 2012

(65) Prior Publication Data
US 2013/0230792 A1    Sep. 5, 2013

(51) Int. Cl.
| | |
|---|---|
| *H01M 8/0217* | (2016.01) |
| *H01M 8/0208* | (2016.01) |
| *H01M 8/0228* | (2016.01) |
| *C23C 4/11* | (2016.01) |
| *C23C 4/134* | (2016.01) |
| *H01M 8/04082* | (2016.01) |
| *H01M 8/1246* | (2016.01) |
| *H01M 8/124* | (2016.01) |

(52) U.S. Cl.
CPC ............ *H01M 8/0217* (2013.01); *C23C 4/11* (2016.01); *C23C 4/134* (2016.01); *H01M 8/0208* (2013.01); *H01M 8/0228* (2013.01); *H01M 8/04216* (2013.01); *H01M 8/1246* (2013.01); *H01M 2008/1293* (2013.01); *H01M 2300/0071* (2013.01)

(58) Field of Classification Search
CPC ............ H01M 8/0228; H01M 8/0208; H01M 8/0217; H01M 8/04216; H01M 8/1246; H01M 2008/1293; H01M 2300/0071; Y02E 60/525; Y02E 60/50; C23C 4/127; C23C 4/105; C23C 4/18; C23C 4/11; C23C 4/134
See application file for complete search history.

(56) References Cited

U.S. PATENT DOCUMENTS

| | | | | |
|---|---|---|---|---|
| 3,881,910 A | * | 5/1975 | Pelton | C23C 4/06 75/252 |
| 5,942,349 A | * | 8/1999 | Badwal | H01M 8/0208 427/115 |
| 8,241,817 B2 | | 8/2012 | Yang et al. | |

(Continued)

FOREIGN PATENT DOCUMENTS

| | | |
|---|---|---|
| CN | 1697229 A | 11/2005 |
| CN | 101438439 A | 5/2009 |

(Continued)

OTHER PUBLICATIONS

Saoutieff, et al "APS Deposition of MnCo2o4 on Commercial Alloys K41X Used as Solid Oxide Fuel Cell Interconnect: The Importance of Post Heat-Treatment for Densification of the Protective Layer", ECS Transactions, 25(2) (2009), pp. 13907-1402.*
Yang, et al "(Mn, Co)3O4 spinel coatings on ferritic stainless steels for SOFC interconnect applications", International Journal of Hydrogen Energy 32 (2007) pp. 3648-3654.*
Garcia-Vargas, et al "Use of SOFC Metallic Interconnect Coated with Spinel Protective Layers using the APS Technology", ECS Transactions, 7 (1) (2007), pp. 2399-2405.*

(Continued)

*Primary Examiner* — Katherine A Bareford
(74) *Attorney, Agent, or Firm* — The Marbury Law Group, PLLC

(57) ABSTRACT

A method of coating an interconnect for a solid oxide fuel cell includes providing an interconnect including Cr and Fe, and coating an air side of the interconnect with a manganese cobalt oxide spinel coating using a plasma spray process.

9 Claims, 5 Drawing Sheets

(56) References Cited

U.S. PATENT DOCUMENTS

| | | | |
|---|---|---|---|
| 8,663,869 B2 | 3/2014 | Janousek et al. | |
| 2005/0255355 A1 | 11/2005 | Ukai et al. | |
| 2006/0193971 A1 | 8/2006 | Tietz et al. | |
| 2007/0190391 A1* | 8/2007 | Otschik | H01M 8/0236 429/456 |
| 2010/0009091 A1* | 1/2010 | Lu | H01M 4/8828 427/448 |
| 2010/0015473 A1 | 1/2010 | Hendrikson et al. | |
| 2010/0119886 A1* | 5/2010 | Nielsen | H01M 8/0217 429/465 |
| 2010/0178589 A1 | 7/2010 | Kwon et al. | |
| 2013/0230644 A1* | 9/2013 | Armstrong | H01M 8/0245 427/115 |

FOREIGN PATENT DOCUMENTS

| | | | |
|---|---|---|---|
| TW | 201119771 A | 6/2011 | |
| WO | WO 2011-096939 A1 | 8/2011 | |

OTHER PUBLICATIONS

International Search Report and Written Opinion received in connection with international application No. PCT/US2013/027895; dated Jun. 24, 2013.

International Preliminary Report on Patentability received in connection with international application No. PCT/US2013/027895; dated Sep. 12, 2014.

J.W. Stevenson et al., "SECA Core Technology Program: Materials Development at PNNL," Pacific Northwest National Laboratory, Richland, WA, SECA Core Technology Review Meeting, Lakewood, CO, Oct. 25, 2005.

Search Report for Taiwanese Application No. CN 102107116, dated Jun. 29, 2016, 2 pages.

Seabaugh, M. et al., "Oxide Protective Coatings for Solid Oxide Fuel Cell Interconnects," ECS Trans., vol. 35, No. 1, 10 pages, (2011).

* cited by examiner

COATINGS FOR METAL INTERCONNECTS TO REDUCE SOFC DEGRADATION

FIELD

The present invention is directed to fuel cell stacks, specifically to interconnects and methods of making interconnects for fuel cell stacks.

BACKGROUND

A typical solid oxide fuel cell stack includes multiple fuel cells separated by metallic interconnects (IC) which provide both electrical connection between adjacent cells in the stack and channels for delivery and removal of fuel and oxidant. The metallic interconnects are commonly composed of chromium containing alloys which retain its strength and is dimensionally stable at typical solid oxide fuel cell (SOFC) operating conditions, e.g. 700-900 C. However, during operation of the SOFCs chromium in the alloys reacts with oxygen and forms chromia, resulting in degradation of the adjacent SOFCs.

Two of the major degradation mechanisms affecting SOFCs are directly linked to chromia formation of the metallic interconnect component: i) ohmic resistance due to the formation of native chromia (i.e., chromium oxide, which can be expressed as $Cr_2O_3$) on the interconnect, and ii) chromium poisoning of the cathode. The chromium containing alloy forms the native oxide of chromium oxide ($Cr_2O_3$) at SOFC operating temperatures (700-900 C) in both air and wet fuel atmospheres. Although $Cr_2O_3$ is electrically conductive, the conductivity of this material at SOFC operating temperatures (700-900 C) is relatively low, with values on the order of 0.01 S/cm at 850 C (versus $7.9 \times 10^4$ S/cm for Cr metal). The chromium oxide layer grows in thickness on the surfaces of the interconnect with time and thus the ohmic resistance due to this oxide layer increases with time.

The second degradation mechanism is known as chromium poisoning of the cathode. During fuel cell operation, ambient air (humid air) flows over the air (cathode) side of the interconnect and wet fuel flows over the fuel (anode) side of the interconnect. At SOFC operating temperatures and in the presence of humid air on the cathode side, chromium on the surface of the $Cr_2O_3$ layer on the interconnect reacts with water and evaporates in the form of the gaseous species chromium oxide hydroxide, $Cr_2O_2(OH)_2$. The chromium oxide hydroxide species transports in vapor form from the interconnect surface to the cathode electrode of the fuel cell where it deposits in the solid form as chromia, $Cr_2O_3$. The $Cr_2O_3$ deposits on and in (e.g., via grain boundary diffusion) the SOFC cathodes and/or reacts with the cathode (e.g. to form a Cr—Mn spinel), resulting in significant performance degradation of the cathode electrode. Typical SOFC cathode materials, such as perovskite materials, (e.g., lanthanum strontium manganate ("LSM"), LSC, LSCF, and LSF) are particularly vulnerable to chromium oxide degradation.

SUMMARY

An embodiment relates to a method of coating an interconnect for a solid oxide fuel cell, comprising providing an interconnect substrate comprising Cr and Fe, and coating an air side of the interconnect substrate with a manganese cobalt oxide spinel coating using a plasma spray process. In an aspect, the method may further include placing the coated interconnect substrate into a solid oxide fuel cell stack. In a further aspect, the method may also include removing a chromia layer from the air side of the interconnect substrate prior to the step of coating such that the spinel coating is formed directly on the chromium-iron alloy surface of the air side of the interconnect substrate that is not coated with chromia; and forming a manganese-cobalt-chromium intermediate spinel layer between the spinel coating and the chromium-iron alloy surface of the air side of the interconnect substrate by reacting the spinel coating with the chromium-iron alloy surface of the air side of the interconnect substrate at an elevated temperature after the step of placing.

Another embodiment relates to a coated interconnect for a solid oxide fuel cell, comprising an interconnect substrate comprising at least 70 weight percent chromium, and a manganese cobalt oxide spinel coating formed over an air side of the interconnect substrate, wherein the spinel comprises a Co:Mn atomic ratio of at least 1:3.

Another embodiment relates to a coated interconnect for a solid oxide fuel cell, comprising an interconnect substrate comprising iron and chromium, a manganese cobalt oxide spinel coating formed over an air side of the interconnect substrate, a manganese-cobalt-chromium intermediate spinel layer located between the spinel coating and the air side of the interconnect substrate, and a perovskite layer located over the spinel coating.

Another embodiment relates to a coated interconnect for a solid oxide fuel cell. The interconnect includes an interconnect substrate including iron and chromium and a composite spinel and perovskite coating formed over an air side of the interconnect substrate. In an aspect, the spinel phase comprises manganese cobalt oxide spinel and the perovskite phase comprises lanthanum strontium manganate.

DETAILED DESCRIPTION

Interconnects may be coated with a single-phase oxide coating consisting of either a perovskite or spinel structure to decrease the growth rate of the native chromium oxide layer and suppress the evaporation of the chromium vapor species. Two common candidates are strontium-doped lanthanum manganate (LSM) and manganese cobaltite (MCO), respectively. LSM is an excellent candidate because of its high electrical conductivity at elevated temperatures (i.e., it does not add substantial ohmic resistance), low oxygen conductivity which suppresses oxide growth underneath it on the IC, and low cation conductivity which suppresses solid state diffusion of Cr through the coating.

Alternatively, MCO is a good candidate for IC coating because it forms a Mn and Co-doped Cr-based oxide beneath the coating on the surface of the IC. The Mn and Co-doped Cr-based oxide has higher electrical conductivity than the native chromia layer. Further, this oxide sinters during high-temperature operation which prevents crack formation or the creation of escape pathways for Cr.

A first embodiment includes applying a coating to an interconnect to decrease the growth rate of the native chromium oxide layer and suppress the evaporation of the chromium vapor species. In one aspect of this embodiment, the coating is a Mn—Co based spinel material ("MCO").

Figure 1A:
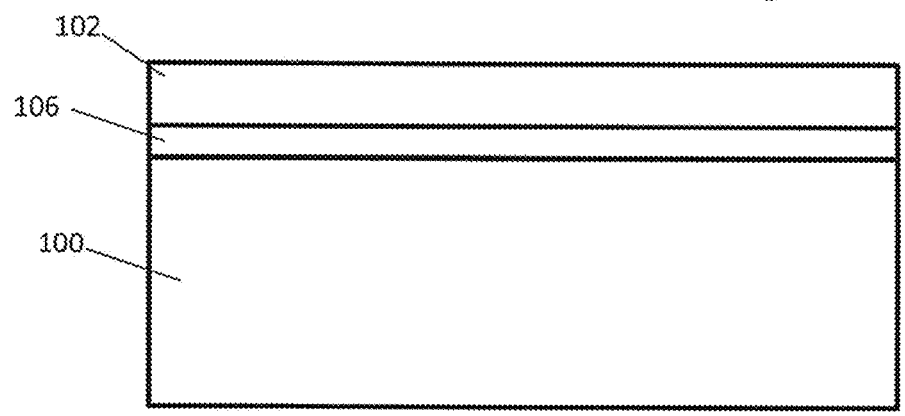
FIG. 1A is a side schematic illustration of an embodiment of an interconnect with a spinel MCO coating and an underlying interfacial oxide.

FIG. 1A illustrates the MCO spinel layer 102 over an air side of a chromium containing interconnect 100. The MCO spinel layer 102 may have the following formula (M1, M2)$_3$O$_{4\pm0.1}$ where M1 comprises at least 70 atomic percent, such as 70-100 at % manganese, and M2 comprises at least 70 atomic percent, such as 70-100 at % cobalt. M1 and/or M2 may contain additional elements, as will be described with respect to the subsequent embodiments below. The MCO spinel encompasses the compositional range from M1$_2$M2$_1$O$_{4\pm1}$ to M2$_2$M1$_1$O$_{4\pm0.1}$.

In the first embodiment, M1 consists of Mn (and unavoidable impurities, if any) and M2 consists of Co (and unavoidable impurities, if any) and the spinel is stoichiometric (i.e., the metal to oxygen atomic ratio is 3:4). In the first embodiment, the MCO spinel encompasses the compositional range from Mn$_2$CoO$_4$ to Co$_2$MnO$_4$. That is, any spinel having the composition Mn$_{2-x}$Co$_{1+x}$O$_4$ ($0 \leq x \leq 1$) or written as $z$(Mn$_3$O$_4$)+(1−$z$)(Co$_3$O$_4$), where ($\frac{1}{3} \leq z \leq \frac{2}{3}$) or written as (Mn, Co)$_3$O$_4$ may be used.

Preferably the spinel composition contains at least 25 atomic percent of cobalt oxide, such as 25 to 60 atomic percent cobalt oxide. Another way to phrase this is that the atomic ratio of Co to Mn in the spinel is preferably at least 1:3, such as 1:3 to 6:4, preferably 1:1. Thus, the preferred but non-limiting spinel composition is Mn$_{1.5}$Co$_{1.5}$O$_4$ which comprises 50 atomic percent manganese oxide and fifty atomic percent cobalt oxide. The MCO coating 102 may have any suitable thickness, such as 20 to 100 microns, preferably greater than 20 microns, such as 25 to 40 microns.

Any suitable chromium containing interconnect substrate 100 may be used. Preferably, the substrate 100 is a chromium based alloy, such as an alloy containing at least 70 weight percent chromium, for example 92 to 97 weight percent chromium, 3 to 7 weight percent iron, and optionally 0 to 1 weight percent of yttrium, yttria, other alloying elements and/or unavoidable impurities. Preferably, the substrate 100 comprises the so-called CrF alloy (e.g., 95 weight percent Cr and 5 weight percent Fe). The alloy may be oxidized on its surface and/or throughout its volume, such that the substrate contains a chromium and/or iron oxide layer on its surface or oxide regions in its volume. However, other suitable substrate 100 materials may be used instead, such as nicrofer, Inconel 600 or X750, Crofer 22 APU or other chromium containing stainless steels.

As shown in FIG. 1A, the interconnect may contain an intermediate (i.e., interfacial) oxide layer 106 between the substrate 100 and the MCO spinel coating 102. The intermediate oxide layer 106 may comprise a native chromia layer on the CrF interconnect substrate 100 and/or the intermediate oxide layer 106 may comprise an intermediate spinel layer containing Cr, Mn, O and optionally Co. For example, the intermediate oxide layer 106 may comprise a (Mn, Cr, Co)$_3$O$_4$ spinel layer formed by reacting the MCO coating 102 with the chromium containing substrate 100 during the SOFC stack high temperature operation or stack annealing to melt the seals or reduce a nickel oxide in the cermet SOFC anode electrodes to nickel, as will be described below. The intermediate layer 106, if present, may have a thickness of 5 microns or less, such as 1 to 5 microns.

The MCO coating 102 is deposited on the interconnect substrate 100 using any suitable deposition method. Preferably, the coating 102 is deposited by a plasma spray process, such as an air plasma spray (APS) process. In a plasma spray process, a feedstock powder is introduced into a plasma jet or spray, emanating from a plasma source, such as a plasma torch. The feedstock powder is melted in the plasma jet (where the temperature is over 8,000K) and propelled towards the interconnect substrate 100. There, the molten droplets flatten, rapidly solidify and form the MCO spinel coating 102. Preferably, the feedstock powder comprises MCO powder having the same composition as the coating 102. However, metal (e.g., Mn, Co or Mn—Co alloy) powder may be used instead and subsequently oxidized to form the MCO spinel coating 102.

The plasma may be generated by either direct current (e.g., electric arc DC plasma) or by induction (e.g., by providing the plasma jet through a center of an induction coil while a RF alternating current passes through the coil). The plasma may comprise a gas stabilized plasma (e.g., argon, helium, etc,). Preferably, the plasma spraying is air plasma spraying (APS) which is performed in ambient air. Alternatively, a controlled atmosphere plasma spraying (CAPS) method may be used which is performed in a closed chamber, which is either filled with an inert gas or evacuated.

Figure 1B:
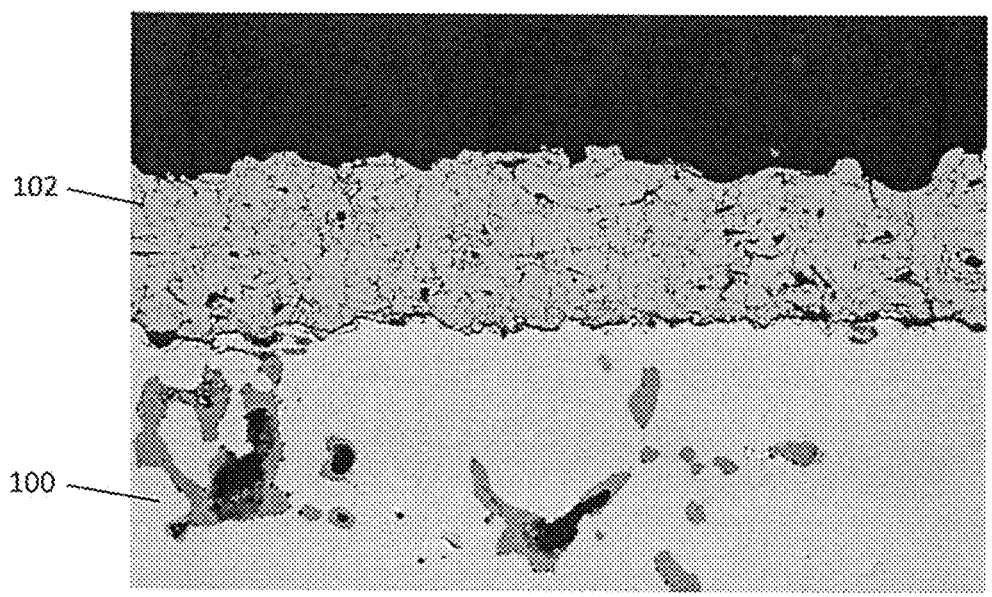
FIG. 1B illustrates a micrograph of an as-deposited APS $Mn_{1.5}Co_{1.5}O_4$ coating according to an embodiment.

Preferably, the native oxide layer is removed from the interconnect substrate 100 prior to the deposition of the coating. For example, the native chromia layer may be removed from the CrF substrate 100 by grinding, polishing, grit blasting, etching or other suitable methods before deposition of the MCO coating 102, such that the native chromia does not substantially reform prior to MCO coating deposition. FIG. 1B is a micrograph illustrating an as-deposited Mn$_{1.5}$Co$_{1.5}$O$_4$ coating 102 on an interconnect 100 after the native chromia layer is removed. The W$_{1.5}$Co$_{1.5}$O$_4$ coating 102 exhibits good density with some porosity and microcracking.

Figure 2:
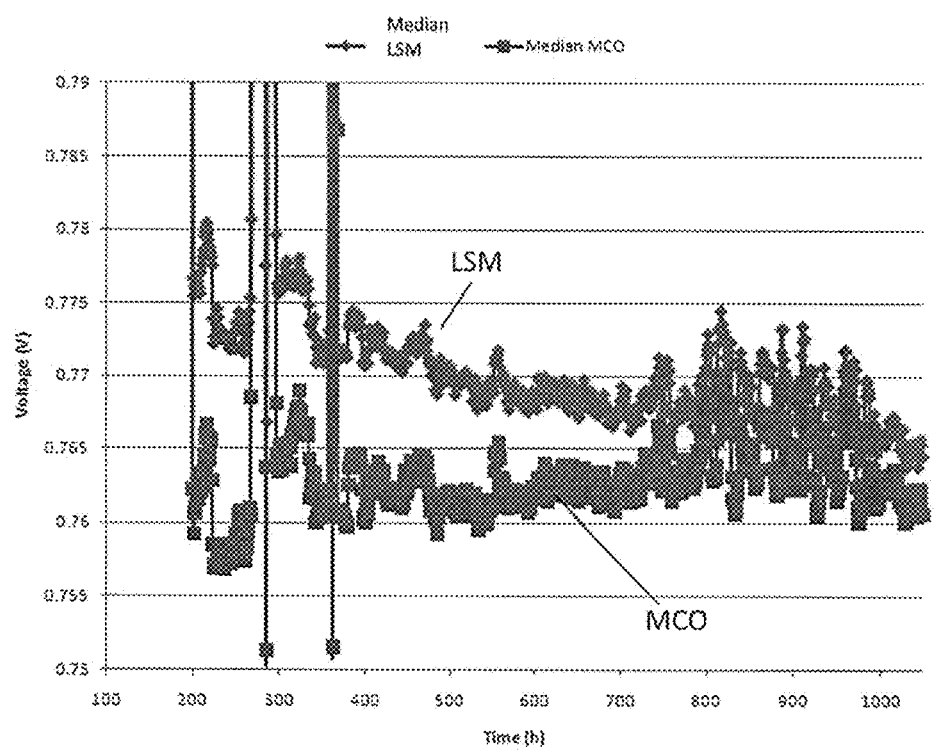
FIG. 2 illustrates a plot of voltage versus time of SOFC stacks tested in dry air comparing degradation rates of repeat elements with LSM to $Mn_{1.5}Co_{1.5}O_4$ spinel interconnect coatings.
Figure 3:
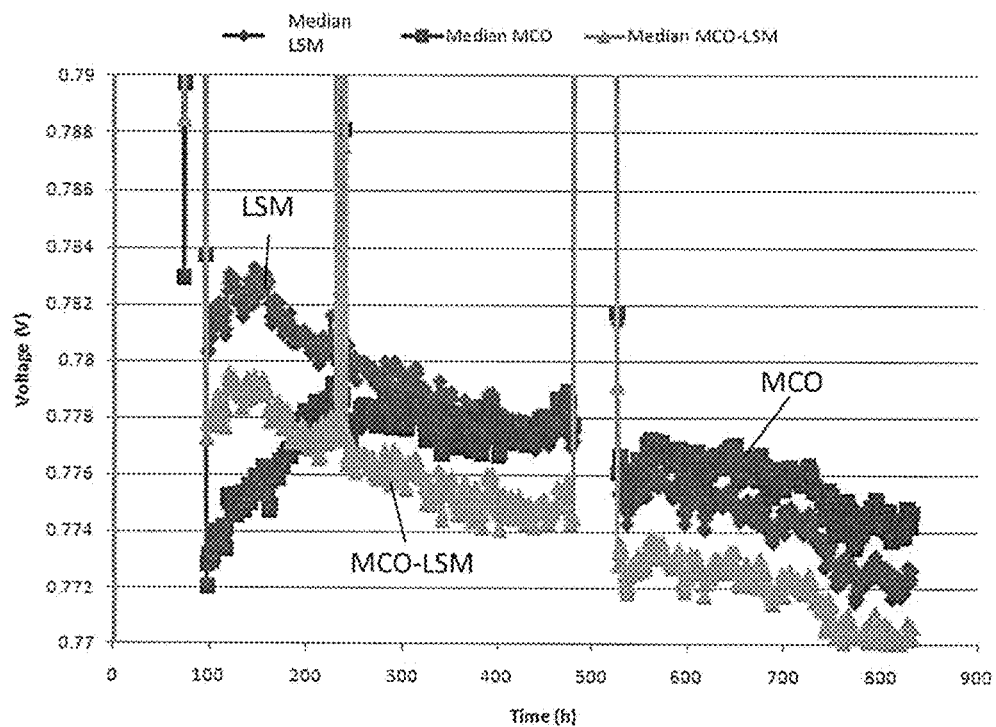
FIG. 3 illustrates a plot of voltage versus time of SOFC stacks tested in wet air comparing degradation rates of repeat elements with LSM, $Mn_{1.5}Co_{1.5}O_4$ spinel, and double layer LSM-$Mn_{1.5}Co_{1.5}O_4$ interconnect coatings.

Planar SOFC stacks containing some interconnects coated with the Mn$_{1.5}$Co$_{1.5}$O$_4$ coating and some interconnects with an LSM coating were tested to give a head-to-head comparison of the coatings. The results of these tests are illustrated in FIGS. 2 and 3. FIGS. 2 and 3 are plots of the voltage verses time for two different SOFC stacks that both contain Mn$_{1.5}$Co$_{1.5}$O$_4$ and LSM coated interconnects 100. The results shown in FIG. 2 are for a stack tested with dry air while the results shown in FIG. 3 are for a stack tested with humid air. In both cases, the degradation rates of the repeat layers with the Mn$_{1.5}$Co$_{15}$O$_4$ coatings are significantly lower than those with the LSM coatings.

In the case of dry air testing (FIG. 2), the Mn$_{1.5}$Co$_{1.5}$O$_4$ coating exhibited a lower ASR degradation relative to the LSM coating. The lower resistivity of the Mn and Co doped Cr spinel layer 106 results in lower degradation of the interconnects and the adjacent SOFC cathode electrodes for Mn$_{1.5}$Co$_{1.5}$O$_4$ coated interconnects relative to LSM coated interconnects (and their adjacent SOFC cathode electrodes).

The resistance of this intermediate chromium containing oxide layer is dependent on both the thickness of the intermediate oxide layer and electrical conductivity of the oxide layer. The coating layer affects the resistance of the oxide layer in two ways, by: i) reducing the growth rate and thus thickness of oxide layer at a given time, and ii) reacting with the oxide layer to produce a secondary oxide phase that has a different composition and conductivity.

The MCO coating 102 acts as a barrier layer suppressing the diffusion of oxygen from the air stream to the intermediate oxide layer 106 on the interconnect substrate 100. This in turn reduces the growth rate of the native chromia layer and/or the intermediate spinel layer 106. Coatings that are effective in reducing oxygen transport from the air stream to the native oxide include materials that exhibit low oxygen diffusivity (solid state diffusion of oxide ions), such as spinel phases. The physical characteristics of a good protective coating include having high density, low connected porosity, no microcracking, and complete coverage of the interconnect.

The coating 102 also affects the resistance of the native oxide by interdiffusion and the formation of secondary phases. The oxide layer that forms on an uncoated CrF interconnect is the native oxide, $Cr_2O_3$. This oxide exhibits conductivity on the order of 0.01 S/cm at 850 C. However, with a coating on the interconnect, a reaction occurs between the native $Cr_2O_3$ oxide and the coating material. This reaction results in the formation of a reaction zone oxide layer which has a conductivity different from either the $Cr_2O_3$ native oxide or the coating material.

In the case of a CrF interconnect coated with LSM, the reaction zone oxide layer that forms is in the spinel family $(Mn, Cr)_3O_4$. The conductivity of the $(Mn, Cr)_3O_4$ spinel is dependent on the composition, with examples given as follows: $MnCr_2O_4$: 0.003 S/cm, $Mn_{1.2}Cr_{1.8}O_4$ 0.02 S/cm and $Mn_{1.5}Cr_{1.5}O_4$ 0.07 S/cm at 800 C.

Generally, the conductivity of the $(Mn, Cr)_3O_4$ spinels are slightly better than the native $Cr_2O_3$. However, the thickness of the reaction zone oxide can be thicker than the native oxide. Thus the total ohmic resistance can be larger. With a $Mn_{1.5}Co_{1.5}O_4$ spinel coating on CrF materials, the reaction zone intermediate oxide layer 106 includes a $(Mn, Cr, Co)_3O_4$ spinel phase. Layer 106 may comprise 60 to 100 volume percent of the $(Mn, Cr, Co)_3O_4$ spinel phase, with the balance (if any) being chromia or other phases. The conductivity of the cobalt containing $(Mn, Cr, Co)_3O_4$ family of spinels is considerably higher than that of the $(Mn, Cr)_3O_4$ spinels as given by the examples: $MnCo_2O_4$: 36 S/cm, $CoCr_2O_4$: 7 S/cm, and $CoMn_2O_4$: 6 S/cm. The higher conductivity of the reaction zone oxide created with the $Mn_{1.5}Co_{1.5}O_4$ spinel coating (which preferably has an electrical conductivity of at least 20 S/cm, such as at least 38 S/cm) on CrF results in lower ohmic resistance losses from this interface and thus lower SOFC performance degradation with time.

In wet air atmospheres and at SOFC operating temperatures, the evaporation rates of chromium from the surface of the interconnect are relatively high. Therefore containment by a coating is preferable. The results of the SOFC stack tested in humid air are illustrated in FIG. 3. These results also show that the repeat layers with the $Mn_{1.5}Co_{1.5}O_4$ spinel coating exhibit lower degradation as compared to the repeat layers with LSM coating.

Figure 4A:
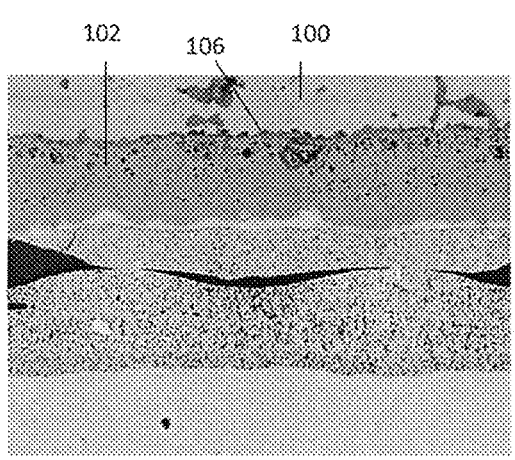
FIGS. 4A and 4B illustrate micrographs of $Mn_{1.5}Co_{1.5}O_4$ spinel coating and LSM perovskite coating, respectively after 1000 hrs of operation in SOFC stack.
Figure 4B:
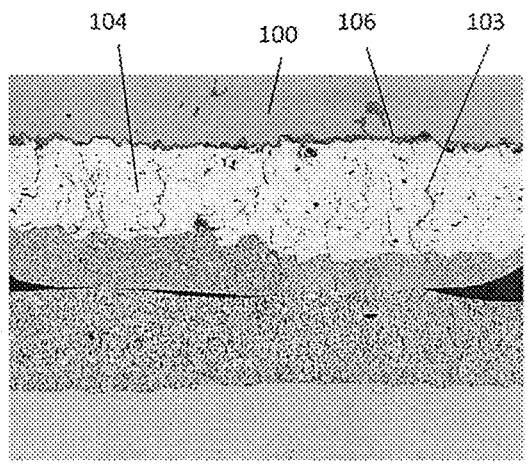

The lower degradation with the $Mn_{1.5}Co_{1.5}O_4$ spinel coating may be attributed to both i) the lower ohmic resistance of the reaction zone oxide layer, and ii) the reduction in the rate of chromium evaporation. FIG. 4A shows a micrograph of the $Mn_{1.5}Co_{1.5}O_4$ coating 102 on a CrF substrate 100 after operating in a SOFC stack (as described with respect to FIG. 5B below) at elevated operating temperature for 1000 hrs. FIG. 4B shows a micrograph of an LSM coating 104 on the CrF substrate 100 in a SOFC stack operated at elevated operating temperature for 1000 hrs. As evident in the micrographs, the $Mn_{1.5}Co_{1.5}O_4$ coating 102 is dense, has no open porosity, and does not have microcracks 103. This is in contrast to the LSM coating 104 which has microcracking after SOFC operation.

The LSM coating 104 tends to sinter during SOFC operation, leading to the formation of microcracks 103 which can allow chromium vapor transport through the coating. Comparison of FIG. 1B with FIG. 4A indicates that even though the as-deposited APS coating of $Mn_{1.5}Co_{1.5}O_4$ shown in FIG. 1B may contain some microcracking and fissures, after a period of time at SOFC operating temperatures (e.g., 700 to 900 C), the MCO coating appears to densify in such a way to heal and eliminate connected microcracks, as shown in FIG. 4B. Likewise, the intermediate chromium containing spinel layer 106 is formed by reaction between the MCO coating 102 and the CrF interconnect substrate 100 during stack fabrication annealing and/or during stack operation at elevated temperature.

A second embodiment of the invention includes doping the spinel powder, e.g. $(Mn, Co)_3O_4$, with Cu to reduce the melting temperature of the spinel. The lowered melting temperature improves (increases) the coating density upon deposition with APS and increases the conductivity of reaction zone oxide. The improvement in the density of the coating due to the lower melting temperature can occur during APS deposition and during operation at SOFC temperature for extended periods of time.

The addition of Cu to the spinel layer has an additional advantage. The Cu doping of the spinel, such as $(Mn, Co)_3O_4$, may result in higher electrical conductivity of the base spinel phase as well as any reaction zone oxides that form between the spinel and the native $Cr_2O_3$ oxide. Examples of electrical conductivities of oxides from the $(Mn, Co, Cu, Cr)_3O_4$ family include: $CuCr_2O_4$: 0.4 S/cm at 800 C, $Cu_{1.3}Mn_{1.7}O_4$: 225 S/cm at 750 C, and $CuMn_2O_4$: 40 S/cm at 800 C.

The spinel family of materials has the general formula $AB_2O_4$. These materials may form an octahedral or cubic crystal structure depending on the elements occupying the A and B sites. Further, depending on the doping conditions, the doped copper may occupy either the A site, the B site or a combination of the A and B sites. Generally, Cu prefers to go into B site. When the A element is Mn, the B element is Co, and the spinel is doped with Cu, the spinel family may be described with the general formula $(Mn, Co, Cu)_3O_4$. More specifically, the spinel family may be described with the following formulas depending on location of the Cu alloying element:

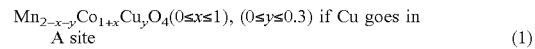

$Mn_{2-x-y}Co_{1+x}Cu_yO_4 (0 \leq x \leq 1), (0 \leq y \leq 0.3)$ if Cu goes in A site     (1)

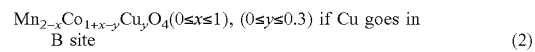

$Mn_{2-x}Co_{1+x-y}Cu_yO_4 (0 \leq x \leq 1), (0 \leq y \leq 0.3)$ if Cu goes in B site     (2)

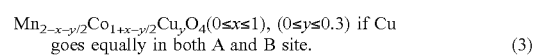

$Mn_{2-x-y/2}Co_{1+x-y/2}Cu_yO_4 (0 \leq x \leq 1), (0 \leq y \leq 0.3)$ if Cu goes equally in both A and B site.     (3)

Specific $(Mn, Co, Cu)_3O_4$ compositions include, but are not limited to, $Mn_{1.5}Co_{1.2}Cu_{0.3}O_4$, $Mn_{1.5}Co_{1.4}Cu_{0.1}O_4$; $Mn_2Co_{0.8}Cu_{0.2}O_4$ and $Co_2Mn_{0.8}Cu_{0.2}O_4$. Additional compositions include $Mn_2Co_{1-y}Cu_yO_4$, where $(0 \leq y \leq 0.3)$, if Cu goes in B site. These composition may also be written, $(Mn_2O_3)+(1-z)(CoO)+z(CuO)$, where $(0 \leq z \leq 0.3)$. Other compositions include $Co_2Mn_{1-y}Cu_yO_4$ where $(0 \leq y \leq 0.3)$ if Cu goes in B site. These composition may also be written, $(Co_2O_3)+(1-z)(MnO)+z(CoO)$ where $(0 \leq z \leq 0.3)$. In one preferred Mn, Co spinel composition, the Mn/Co ratio is 1.5/1.5, e.g. $Mn_{1.5}Co_{1.5}O_4$. When B site doped with Cu, preferred compositions include $Mn_{1.5}Co_{1.5-y}Cu_yO_4$, where $(0 \leq y \leq 0.3)$.

In a third embodiment, $(Mn, Co)_3O_4$ or $(Mn, Co, Cu)_3O_4$ spinel families are doped with one or more single valence species. That is, one or more species that only have one valence state. Doping with single valence species reduces cation transport at high temperature and thus reduces the thickness of the intermediate oxide layer 106. The primary ionic transport mechanism in spinels is through cation diffusion via cation vacancies in the lattice structure. In spinels with multivalent species $M^{2+/3+}$, such as $Mn^{3+/4+}$ and $Co^{2+/3+}$, cation vacancies are generated when M species are oxidized from lower to higher valance states to maintain local charge neutrality. The introduction of a single valence species typically decreases the amount of cation vacancies and decreases the amount of interdiffusion between the spinel coating 102 and the native $Cr_2O_3$ oxide or the CrF substrate 100. In this manner, the amount of the intermediate oxide layer 106 that forms is decreased. Examples of single valence species that may be introduced into the spinel coating include $Y^{3+}$, $Al^{3+}$, $Mg^{2+}$ and/or $Zn^{2+}$ metals. In an aspect, the spinel coating has a composition of $(Mn, Co, M)_3O_4$, where M=Y, Al, Mg, or Zn. For example, if M=Al doped in the A position, then the spinel compositions may include $Mn_{2-y}Al_yCoO_4$ $(0 \leq y \leq 0.3)$ or $(1-z)(Mn_2O_3)+z(Al_2O_3)+CoO$, where $(0 \leq z \leq 0.15)$.

In a fourth embodiment, a second phase is added to a $(Mn, Co)_3O_4$ spinel to act as a getter for impurities, such as sulfur and silicon. In this manner, the adhesion of the coating to the CrF interconnect substrate 100 may be improved. For example, metal oxide phases, such as non-spinel metal oxides, for example, $Al_2O_3$, $Y_2O_3$, or $TiO_2$ may be added to the spinel phase of the coating 102 as a second phase. In one aspect, when the metal oxide phase is alumina, the coating composition may be $(1-x)(Mn, Co)_3O_4$ and $x(Al_2O_3)$, where $(0 \leq x \leq 0.02)$. In this case, the $Al_2O_3$ primarily exists as a second phase and not as a doping agent in the spinel structure. During deposition and at SOFC operation temperatures, however, some interdiffusion may occur. In this case, aluminum, yttrium or titanium doping of the spinel phase will occur.

Figure 5A:
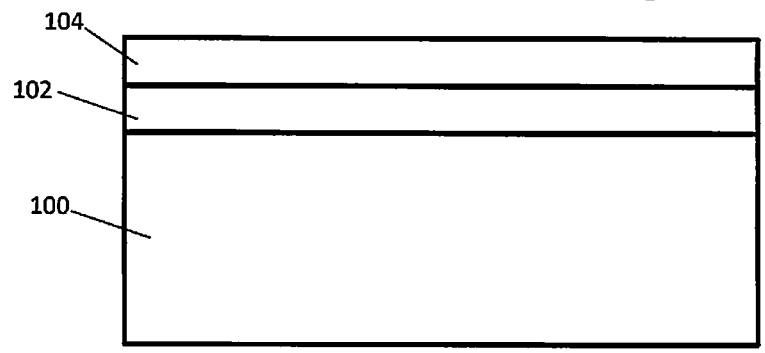
FIG. 5A is a side schematic illustration of an embodiment of an interconnect with a bilayer coating.

In a fifth embodiment illustrated in FIG. 5A, the protective coating is a bi-layer film composed of an MCO spinel coating 102 over the interconnect substrate 100 and a perovskite layer 104 over the MCO spinel coating. The perovskite layer may comprise any suitable perovskite layer described above, such as LSM. LSM may have the following formula: $La_{1-x}Sr_xMnO_3$ (LSM), where $0.1 \leq x \leq 0.3$, such as $0.1 \leq x \leq 0.2$. The spinel coating 102 is deposited first and is in direct contact with the interconnect substrate 100 (if the native chromia layer is removed from the substrate) or the native chromia layer on the substrate 100. The perovskite layer 104 is then deposited on top of the spinel coating 102. The intermediate oxide layer 106 may be formed by reaction between the spinel coating and the interconnect substrate during subsequent interconnect or stack annealing or operation. The bi-layer coating may decrease the degradation of the adjacent SOFC in three ways. First, the spinel coating 102 provides Mn and Co elements to the intermediate oxide layer 106, thereby decreasing the resistance of the intermediate chromium containing oxide layer 106. Second, the spinel coating 102 prevents direct interaction between the perovskite layer 104, such as LSM, and the chromium containing intermediate oxide layer 106 which can lead to the formation of unwanted and resistive secondary phases. Third, the top perovskite layer 104 is a second barrier layer that decreases the transport of oxygen to the intermediate oxide layer 106. The top perovskite layer 104 thus reduces the growth rate and the thickness of a native chromia on the substrate 100. The top perovskite layer 104 also reduces the amount of chromium transport (via solid state or gas phase) from the metallic interconnect substrate 100 to the cathode electrode of the adjacent SOFC in the stack.

Figure 5B:
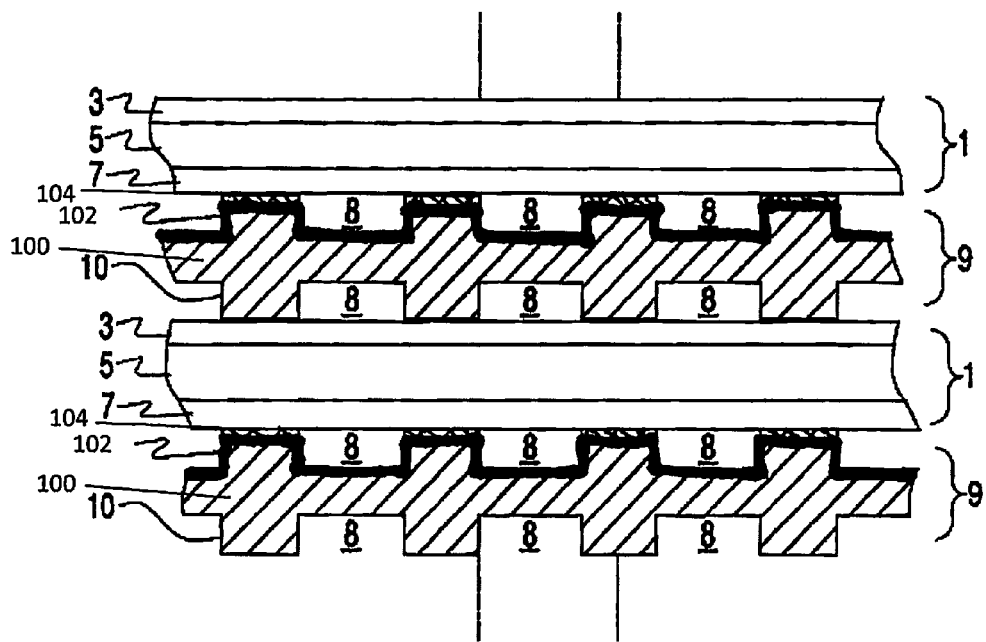
FIG. 5B is a side schematic illustration of an embodiment of a solid oxide fuel cell stack which includes an interconnect with a bilayer coating on its ribs.

In another aspect of the fifth embodiment shown in FIG. 5B, the MCO coating or layer 102 is formed over the entire air side or surface of the interconnect 9, while the perovskite layer 104 is formed on the MCO coating 102 only on the ribs or ridges of the interconnect 9, but not in the air flow channels or passages in the interconnect 9.

An example of a solid oxide fuel cell (SOFC) stack is illustrated in FIG. 5B. Each SOFC 1 comprises a cathode electrode 7, a solid oxide electrolyte 5, and an anode electrode 3. Fuel cell stacks are frequently built from a multiplicity of SOFC's 1 in the form of planar elements or other geometries. Fuel and air is provided to the electrochemically active surfaces of the anode 3 and cathode 7 electrodes, respectively. The interconnect 9 containing gas flow passages or channels 8 between ribs 10, separates the individual cells in the stack. The interconnect 9 electrically connects the anode or fuel electrode 3 of one cell 1 to the cathode or air electrode 7 of the adjacent cell 1. The interconnect 9 separates fuel, such as a hydrocarbon fuel, flowing in the fuel channels 8 between ribs 10 on the fuel side of the interconnect to the fuel electrode (i.e. anode 3) of one cell 1 in the stack, from oxidant, such as air, flowing in the air channels 8 between ribs 10 on the air side of the interconnect to the air electrode (i.e. cathode 7) of an adjacent cell 1 in the stack. At either end of the stack, there may be an air end plate or fuel end plate (not shown) for providing air or fuel, respectively, to the end electrode. FIG. 5B shows that the lower SOFC 1 is located between two interconnects 9.

As shown in FIG. 5B, the MCO spinel coating 102 is located over the ribs 10 and the air channels 8 on the air side of the interconnects 9 facing the adjacent SOFC 1 cathode 7 in the stack. The perovskite layer 104 (e.g., LSM) is located over the MCO coating 102 only over the rib 10 areas, but not in the air channel 8 areas. This allows the perovskite (e.g., LSM) layer 104 to contact the same or similar perovskite (e.g., LSM) cathode 7, without coating the entire air side of the interconnect 9 with the perovskite layer 104. The intermediate oxide layer (not shown in FIG. 5B) above may be formed between the CrF interconnect 9 substrate 100 and the MCO spinel coating 102 after stack annealing and/or operation.

Figure 6:
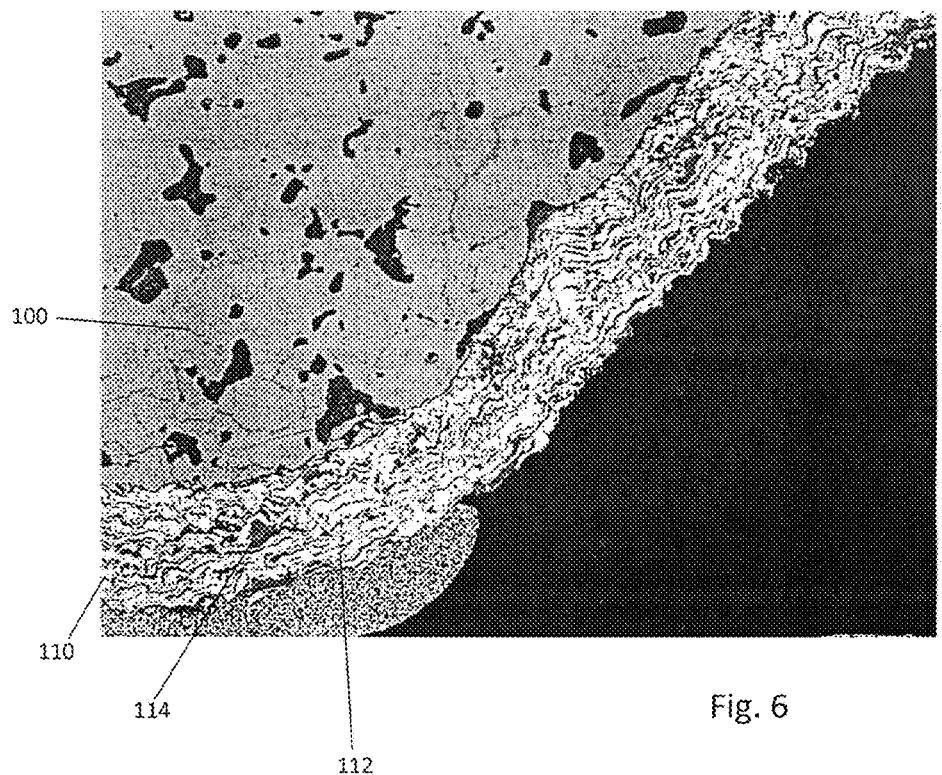
FIG. 6 is a micrograph illustrating an embodiment of an interconnect with a composite LSM-MCO coating.

The sixth embodiment of the invention provides a composite perovskite and spinel coating rather than the bilayer spinel and perovskite coating. FIG. 6 is a micrograph illustrating the interconnect with a composite LSM-MCO coating. The composite LSM/MCO coating 110 according to this embodiment is designed to utilize the best features of each of these individual coatings discussed above. The composite coating 110 illustrated in FIG. 6 comprises 40 wt % MCO and 60 wt % LSM and is conditioned (two day cycle at 850° C.) in a SOFC stack. The light phase 112 is LSM while the dark phase 114 is MCO. Thus, the LSM and MCO phases are present as distinct regions in the composite coating. Without wishing to be bound by a particular theory, it is believed that the MCO phase may form plate-like or pancake-like (e.g., longer than thicker) structures 114 in the LSM phase matrix 112. However, the structure may be different for different compositions and/or deposition methods of the composite coating 110.

The presence of crack-healing pancake-like MCO structures within the composite coating 110 suppresses Cr evaporation through cracks generated in the LSM. The presence of LSM stabilizes the composite LSM/MCO coating in reducing atmospheres such that spallation does not occur and coating integrity is maintained. Preferably, the MCO content of the composite coating 110 is sufficiently high to form the Mn—Cr—Co oxide (e.g., spinel 106) scale on the IC, which provides lower ohmic resistance compared to a single-phase LSM coating, which may only form a MnCr oxide spinel on the interconnect surface. As can be seen in FIG. 6, the composite coating 110 does not exhibit any cracking or spalling after two days of conditioning at 850° C. in the SOFC stack.

The composition of the composite coating 110 may be any ratio of LSM:MCO as long as there is a mix of the two materials (not a bi-layer coating). For example, the perovskite to spinel (e.g., LSM:MCO) weight ratio may range between 20:80 and 90:10, such as 50:50 to 80:20. The composition of the individual LSM and MCO materials in the composite coating 110 may vary as described above and may have any level or ratio of non-oxygen constituents, and may include other phases besides the pervoskite and spinel phase and/or other elements besides Mn, Co, La, Sr and O. For example, the spinel phase 114 of the coating 110 may comprise $Mn_{2-x}Co_{1+x}O_4$, where $0 \leq x \leq 1$ and the perovskite phase 112 may comprise $La_{1-x}Sr_xMnO_3$ (LSM), where $0.1 \leq x \leq 0.3$, such as $0.1 \leq x \leq 0$.

The composite coating 110 may be deposited on the interconnect using any deposition method, such as, but not limited to APS. Preferably, the perovskite and spinel are deposited together in one step. For example, APS feedstock powder provided into the plasma in the APS process may comprise a mixture of LSM and MCO powder having the same weight ratio as that desired for the coating 110.

The microstructure, thickness, or any other physical property of the coating may vary and can be of any form. However, a dense coating is preferred. The composite coating 110 may be deposited on any location on the interconnect. That is, the composite coating is not limited to any specific portion of the interconnect, but is preferred to be deposited on the cathode side of the interconnect.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of coating an interconnect for a solid oxide fuel cell, comprising:
   providing an interconnect substrate comprising a chromium-iron alloy comprising at least 70 weight percent chromium;
   removing a native chromia layer from the interconnect substrate to expose a chromium-iron alloy surface of the interconnect substrate;
   providing a mixture of manganese cobalt oxide spinel feedstock powder and strontium-doped lanthanum manganate perovskite feedstock powder into a plasma to coat an air side of the interconnect substrate with a single layer composite coating containing strontium-doped lanthanum manganate and manganese cobalt oxide directly on the exposed chromium-iron alloy surface of the interconnect substrate using a plasma spray process;
   placing the coated interconnect substrate into a solid oxide fuel cell stack, such that the single layer composite coating directly contacts a solid oxide fuel cell of the stack and directly contacts the air side of the interconnect substrate, the air side of the interconnect substrate comprising the chromium-iron alloy comprising at least 70 weight percent chromium; and
   conditioning the interconnect substrate, having on its air side only the single layer composite coating, in the solid oxide fuel cell stack, to form a manganese-cobalt-chromium intermediate spinel layer between the composite coating and the chromium-iron alloy surface of the air side of the interconnect substrate, the intermediate spinel layer comprising a $(Mn, Cr, Co)_3O_4$ spinel phase and the composite coating comprising a strontium-doped lanthanum manganate perovskite phase and a manganese cobalt oxide spinel phase;
   wherein:
   forming the manganese-cobalt-chromium intermediate spinel layer during the step of conditioning comprises forming the intermediate spinel layer by reacting the single layer composite coating with the chromium-iron alloy surface of the air side of the interconnect substrate at an elevated temperature after the step of placing;
   the composite coating comprises distinct regions of the manganese cobalt oxide spinel phase in a matrix comprising the strontium-doped lanthanum manganate perovskite phase;
   the manganese cobalt oxide spinel phase regions have plate-like or pancake-like structures;
   the plate-like or pancake-like structures comprise crack-healing structures within the composite coating which suppress Cr evaporation through cracks generated in the matrix comprising the strontium-doped lanthanum manganate perovskite phase during operation of the solid oxide fuel cell stack; and
   the matrix comprising the strontium-doped lanthanum manganate perovskite phase stabilizes the composite coating in reducing atmospheres such that spallation does not occur during operation of the solid oxide fuel cell stack.

2. The method of claim 1, wherein the manganese cobalt oxide spinel comprises $Mn_{2-x}Co_{1+x}O_4$, wherein $0 \leq x \leq 1$.

3. The method of claim 2, wherein the manganese cobalt oxide spinel comprises $Mn_{1.5}Co_{1.5}O_4$.

4. The method of claim 2, wherein:
   the manganese cobalt oxide spinel comprises a Co:Mn atomic ratio of at least 1:3; and
   the interconnect substrate comprises a chromium-iron alloy containing 92 to 97 weight percent chromium, 3 to 7 weight percent iron, and 0 to 1 weight percent of yttrium or yttria.

5. The method of claim 1, wherein the composite coating further comprises a getter.

6. The method of claim 5, wherein the getter comprises at least one of $Al_2O_3$, $Y_2O_3$, or $TiO_2$.

7. The method of claim 1, wherein the intermediate spinel layer comprises 60 to 100 volume percent of the $(Mn, Cr, Co)_3O_4$ spinel phase.

8. The method of claim 1, wherein the composite coating comprises a perovskite phase to spinel phase weight ratio between 20:80 and 90:10.

9. The method of claim 1, wherein the composite coating comprises a perovskite phase to spinel phase weight ratio between 50:50 and 80:20.

* * * * *